Figure 1:
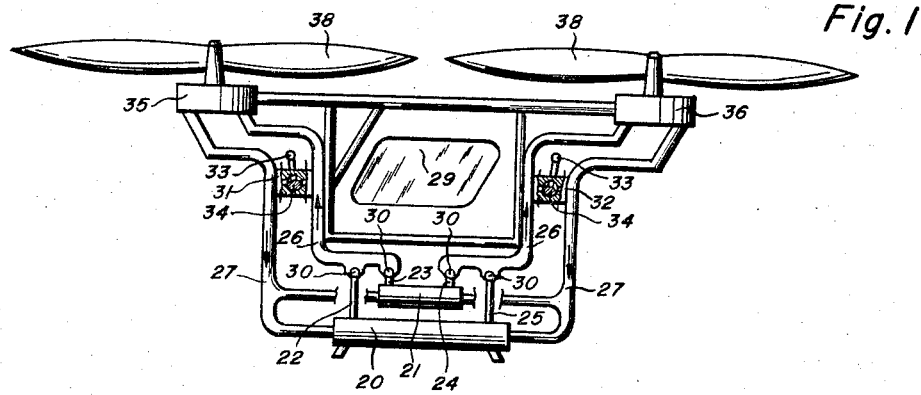

Oct. 3, 1967 K. EICKMANN 3,345,016
FLUIDBORNE VEHICLE, DRIVEN BY HYDRAULIC MOTORS AND PARTIALLY
CONTROLLED BY VARIABLE BYPASS MEANS
Filed Aug. 17, 1965

INVENTOR

KARL EICKMANN

BY *M. Flew and Toren*

ATTORNEY

3,345,016
FLUIDBORNE VEHICLE, DRIVEN BY HYDRAULIC MOTORS AND PARTIALLY CONTROLLED BY VARIABLE BYPASS MEANS
Karl Eickmann, 2420 Isshiki, Kanagawa-ken, Hayama-machi, Japan
Filed Aug. 17, 1965, Ser. No. 480,388
11 Claims. (Cl. 244—17.23)

This application is a continuation-in-part of my copending application Serial No. 368,820, filed May 20, 1964, and now U.S. Patent No. 3,253,806, issued May 31, 1966.

This invention relates to fluidborne vehicles, which can move or rest in fluid, especially in air, and which are driven by a plurality of revolving members, rotor members, or rotary propulsion members, each one of which is driven by at least one hydraulic motor, preferably a positive displacement motor, while each hydraulic motor is supplied with and driven by a separate flow of fluid under pressure, while maintaining all the rates of flow proportional to each other.

In my Patent No. 3,253,806, there is described a fluidborne vehicle which may fly as a helicopter and which is driven by more than one hydraulic motor which drive propellers with substantially proportional angular velocity. The proportionality of the angular velocity, which is an important necessity in order to achieve stability of the vehicle while it is either stationary or moving in fluid, is effected, in my Patent No. 3,253,806, either by driving two hydraulic motors connected in series in a fluid flow for driving by the same flow or by driving the two motors by separate flows whose rates of flow are proportional to each other. The delivery quantity adjustment device of the fluid flow producing means for the variation of the rotary velocity of the fluid flow producing means of my Patent No. 3,253,806 are able, to control the upward or downward movement of the vehicle by increasing or decreasing the rotary velocity of the revolving propulsion members. However, there are no control means for controlling the forward, backward, or sideward movement of the vehicle.

My copending patent application Serial No. 368,820, now U.S. Patent No. 3,211,399, discloses control means which can control the forward or backward movement of a hydraulically operated fluid-borne vehicle with propulsion members rotating about substantially vertical axes, if two fluid motors are connected in series in the same flow of fluid and if the motors drive the propulsion members. The fluid-borne vehicles of Patent No. 3,211,399 include a delivery fluid line extending from a fluid flow producing means to a first hydraulic motor, a medial fluid line extending from the first hydraulic motor to a second hydraulic motor and a return fluid line extending from the second hydraulic motor directly or indirectly to the fluid flow producing means. A variable bypass means is provided, either between the delivery fluid line and the medial fluid line, for bypassing an adjustable quantity of fluid around the first hydraulic motor, or a variable bypass is provided between the medial fluid line and the return fluid line for bypassing a variable quantity of fluid around the second hydraulic motor. The bypassing of fluid varies the angular velocity of the bypassed hydraulic motor and thereby the angular velocity of the propulsion members to a limited extent relative to each other. This effects an inclination of the vehicle to a limited extent and, as a consequence, provides a horizontal movement of the vehicle.

The control means of Patent No. 3,253,806 requires two fluid motors in series in the same fluid flow, and the consequence of such arrangement is that the pressure drop, during driving one of the motors, is less than half of the maximum pressure in the hydraulic circuit. Consequently, an about double quantity of fluid must flow through the circuit compared to the flow in separate motor circuits of the same maximum pressure in fluid. The fluid lines therefore must be of relative large inner diameter, and the hydraulic motors must have relatively large dimensions because of the necessity to produce enough power, with only half of the maximum pressure, to drive the revolving propulsion member.

There have been numerous earlier proposals to drive aircraft, helicopters, or the like by hydraulic fluid power means. However, these earlier proposals have failed to provide means providing rates of flow to the respective motors which are proportional to each other. They have therefore not been able to maintain stability of the vehicle during its movement or when it is at rest in a fluid, and consequently have been failures from the practical standpoint.

My present invention is intended to overcome such limitations or drawbacks of earlier fluidborne vehicles.

Accordingly, an object of the present invention is to control the horizontal movement of a fluid-borne vehicle having propulsion members revolving about substantially vertical axes, the vehicle including at least two propulsion members driven by respective hydraulic motors whose angular velocities are proportional to each other and which are supplied with separate fluid flows whose rates of flow are proportional to each other.

Another object of the invention is to provide a control for the horizontal movement of a fluid-borne vehicle of the type just mentioned including a suitable bypass means, such as a bypass means having a variable orifice, effective to bypass a limited and adjustable quantity of fluid from a delivery fluid line to a respective hydraulic motor to a return fluid line downstream of the respective hydraulic motor.

Thereby, by controllably utilizing such a bypass, the angular velocity of one propulsion member can be changed, to a limited extent, relative to the angular velocity of another propulsion member so that the vehicle can incline or tip to a limited extent. This is effective to initiate, maintain, or terminate a horizontal movement. Furthermore, the hydraulic motors and the fluid flow passages can be of small dimensions, because the fluid can be utilized at its maximum of available pressure inasmuch as fluid is supplied separately to the respective hydraulic motors and is returned therefrom, either directly or indirectly with cooling, to the fluid flow producing means.

Another object of the invention is to provide a fluid-borne vehicle with a plurality of propulsion members which are rotated by hydraulic motors, wherein at least three, and preferably four or more, separate flows of fluid whose rates of flow are proportional to each other are utilized in the vehicle for driving respective fluid motors which, in turn, drive rotary propulsion members with angular velocities proportional to each other and wherein bypass means are provided to bypass fluid around each respective motor so that the inclination of the vehicle, whose propulsion members rotate about substantially vertical axes, can be effected by selectively using the bypass means. Thereby, horizontal movement of the vehicle can be controlled and movement of the vehicle can be effected in any desired direction.

A further object of the invention is to provide a fluid-borne vehicle having a plurality of hydraulically driven rotary propulsion members rotatable about substantially vertical axes, and in which both the upward and downward movement as well as the horizontal movement in all directions can be effectively controlled.

In accordance with the present invention, this is achieved by using a fluid flow producing means whose delivered fluid flow quantity can be varied, and which delivers its fluid flow to separate hydraulic fluid flow circuits of the vehicle, with the rates of flow in the several circuits being proportional to each other.

More objects and features of my invention may become apparent from a study of the drawings with the accompanying description thereof. In the drawings FIG. 1 is an elevation view of a fluid-borne vehicle embodying the invention.

Figure 2:
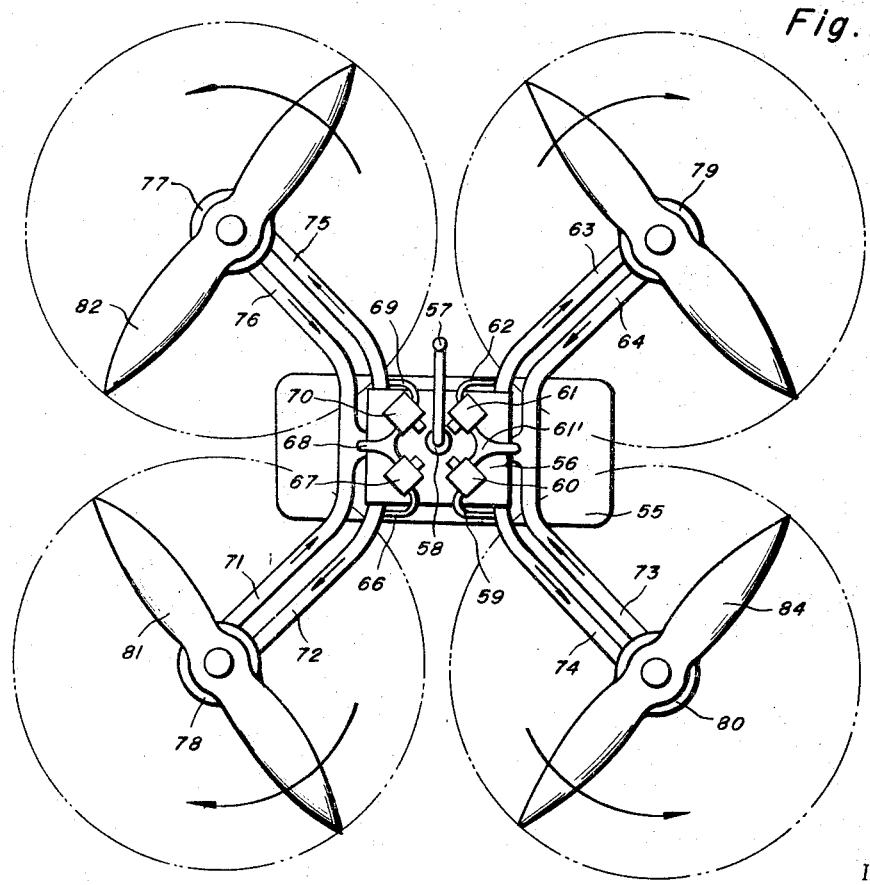

FIG. 2 is a plan view, looking down from above, on another form of fluid-borne vehicle embodying the invention.

FIG. 1 illustrates an embodiment of the invention, in the form of a helicopter, including two rotors each of which is driven by a respective hydraulic motor, the two hydraulic motors being separately supplied. Respective variable or controllable bypass means are associated with each motor to adjustably control the angular velocity of the associated motor and thus the angular velocity of the rotor driven thereby.

FIG. 2 illustrates an embodiment of the invention, again illustrated as a helicopter, wherein there are four hydraulic motors each operating a respective rotor and each having a separate fluid supply thereto.

Referring now to FIGURE 1, it will be seen that there is a plurality of fluid flow producing means 20 and 21. Each one of these fluid flow producing means produces two separate flows of fluid. Each of the separate flows of fluid flows through a respective check valve 30 into a respective fluid supply line. Each fluid flow producing means 20 and 21 has a first output or delivery connected to a first common supply line 26, and a second output or delivery connected to a second supply line 26, one supply line 26 supplying the hydraulic motor 35 and the other supply line 26 supplying the hydraulic motor 36. Each motor drives a respective rotor 38. There are a pair of common return lines 27, each of which is connected to a respective hydraulic motor 35 or 36, and these return lines are commonly connected to the two fluid flow producing means 20 and 21. Respective cooling means may be provided for the return flows.

Respective bypass means 31 and 32 are associated with each motor 35 and 36, each bypass means connecting a respective supply line 26 to a respective return line 27. The flow area of each bypass means may have such a small cross section that only a small amount of fluid can pass from the high pressure supply line to the low pressure return line. Opening of a bypass 31 or 32 results in a part of the fluid escaping through the bypass means and the rotary velocity of the respective hydromotor decreases slightly, thereby inclining the vehicle.

Each bypass 31 or 32 includes a control valve means 34 which is operable by a control lever 33. When a bypass is opened either partially or fully by operation of the respective control lever 33, the fluid flow returns through the associated return line 27, preferably through a control means, to the fluid flow producing means 20 and 21. By virtue of the bypass means 31 and 32, independent movement or inclination of the vehicle can easily be effected by opening or closing of one or the other of the bypasses to accordingly control the angular velocity of the associated motor 35 and 36 and thus the angular velocity of a respective rotor 38.

Referring now to FIGURE 2, this is practically the same vehicle as in FIGURE 1, but it differs therefrom in that the vehicle of FIGURE 2 has, instead of two separate flows, four separate flows. It might have even more, although only four separate flows are shown in FIGURE 2. The body of the vehicle 55 carries one or more fluid flow producing means 56 for producing four separate flows of fluid. One separate flow of fluid flows from fluid flow producing means 56 through a supply line 75 to a hydraulic motor 77 rotating a rotor or propeller 82, and this flow returns through a return line 76 from motor 77 to fluid flow producing means 56.

A second separate fluid flow flows through supply line 72 to hydraulic motor 78 operating propeller or rotor 81, and returns through return line 71 from motor 78 to fluid flow producing means 56.

A third fluid flow flows from fluid flow producing means 56 through supply line 63 to hydraulic motor 79 rotating a rotor or propeller 83, and this fluid flow returns from motor 79 through a return line 64 to fluid flow producing means 56. The fourth separate fluid flow flows from fluid flow producing means 56 through a supply line 74 to a hydraulic motor 80 driving a propeller or rotor 84, and this fourth fluid flow returns from motor 80 through return line 73 to fluid flow producing means 56. The several fluid flows may be returned directly to fluid flow producing means 56 or may be returned indirectly, as by passing through cooling means or being directed to a sump connected to fluid flow producing means 56.

A bypass conduit 59 connects supply conduit 74 to a bypass means 60, and a bypass conduit 62 connects supply conduit 63 to a bypass means 61. A bypass conduit 61' commonly connects bypass means 60 and 61 to return lines 64 and 73. Similarly, a bypass conduit 66 connects supply line 72 to a bypass means 67, and a bypass conduit 69 connects supply line 75 to a bypass means 70. A bypass conduit 68 commonly connects bypass means 67 and 70 to return conduits 71 and 76.

When any one of the bypass means 60, 61, 67 or 70 is opened either fully or partially, at least a part of the flow of fluid to its associated hydraulic motor is bypassed between the respective supply conduit and the respective return conduit. This decreases the angular velocity of the associated hydraulic motor and thus decreases the angular velocity of the propeller or rotor driven thereby. Thus, the vehicle can be made to incline and change its attitude, or can be made to move in any given direction.

A common controller 58 is provided for the four bypass means 60, 61, 67 and 70, and this common controller is operated by a control lever 57. The control means 57 and 58 is universally swingable, and is substantially similar to the "joy stick" commonly used for operating the control surfaces of light aircraft to bank and turn. As control lever 57 is moved in any given direction, controller 58 will engage one or more operating plungers or buttons of respective bypass means 60, 61, 67 or 70 to open one or more of these bypass means. Movement of control lever 57 to the upper right in FIGURE 2 would mean that bypass means 61 would open and that motor 79 would slow down with the result that the vehicle would tilt down to the upper right of the figure and that the vehicle would start a movement in that direction. On the other hand, a movement of control lever 57 directly upwards in the figure would result in that both bypasses 61 and 70 are opened and both motors 79 and 77 would slow down, which would result in the vehicle moving upward in the figure. Moving the control lever 57 to the upper left would result in the opening of bypass means 70 slowing down the speed of motor 77, thereby moving the vehicle in the upper leftward direction of the figure. Moving the controller 57 leftwards would mean opening both bypass means 70 and 67 so that both motors 77 and 78, would slow down and the vehicle would tilt to the left and move in a leftward direction.

Movement of control lever 57 toward bypass 67 would result in the opening of this bypass for slowing down the rotary velocity of motor 78, so that the vehicle would tilt left downward and move in that direction. Moving the control lever 57 downward would result in opening both bypass means 67, 60, thereby slowing down the motors 78 and 80, and thus tilting the vehicle downward and moving the vehicle in a downward direction. Moving the control means 57 in a right downward direction would result in the opening of the bypass means 60 thereby slowing down the motor 80 and tilting the vehicle right downward to move downward to the right.

It will thus be clear that by using only one control lever, the very simple vehicle of FIG. 2 can be moved horizontally in any direction, such as forward, backward, to the right or to the left, and in any combination of these directions, and without flying a curve. However, if it is desired to fly a curve, the vehicle can be made to follow a curved path.

Another important feature of the invention is that, by use of the delivery quantity adjustment device, or the device for changing the rate of flow, associated with the flow producing means 56, the novel vehicles of this invention can not only fly any desired curved or straight path in a horizontal plane, but also any desired spherical path, either curved or straight. The rate of flow in the fluid lines from the fluid flow producing means to the respective fluid motors may be adjusted, as described in my above mentioned patents. For instance, the fluid flow producing means 20 or 21 of FIGURE 1, or 56 of FIGURE 2, may be a variable two-flow or a variable four-flow pump for supply of two or four flows of fluid of proportional delivery quantity or of proportional delivery rate of flow in each of the separate fluid supply lines. The adjustment device of such fluid flow producing device can change the rate of flow proportionally in each fluid line from maximum down to zero or vice versa. Thereby the angular velocity of the hydraulic motors, and thus of the rotor members or rotary propulsion members of the vehicle, can be changed from zero to maximum and vice versa.

Thus, if the adjustment device increases the delivery quantity or the rate of flow in the separate fluid lines, the angular velocity of the revolving members increases, so that the vehicle may fly upward. Upon a decrease of the delivery quantity or rate of flow by varying the adjustment device of the fluid flow producing means, the vehicle may descend, come to a stop, or stand still.

The combined control of the delivery quantity or rate of flow from the fluid producing means 56, and the proportionate variation of the flow through the several respective supply lines by selective operation of the bypass means, has the effect that the vehicle can follow any desired course in three dimensions, or can remain at rest. Since, the arrangement shown and described in my mentioned patents require only a single lever or control means for adjustment of the delivery quantity or rate of flow of the fluid flow producing means, and since the bypass means of the present invention can be controlled by a single control lever or control means, the provision of only two control levers or control means enables full control of the attitude of flight direction of the invention vehicle.

Additionally, the two control levers can be so positioned and mounted that the direction of lever operation directly indicates the desired vehicle movement, and the amplitude of control lever movement directly indicates the desired speed of the vehicle. For example, an upward movement of the flow rate adjustment lever can be made to result in an upward movement of the vehicle, and vice versa. Correspondingly, the movement of the bypass control lever 57 in a certain direction results in movement of the vehicle in that direction.

Consequently, the vehicle operator may manually move the control levers in any direction in which he desires the vehicle to move, and the vehicle will follow the movement of his hand. Consequently, it is nearly impossible to make errors in flying the vehicle because the control levers are moved naturally in the desired direction of movement of the vehicle. The vehicle is thus so simple to operate that even untrained persons can fly the same without specific training as pilots.

Safety devices may be applied to prevent a sudden decrease of the flow rate, or to restrict the range of adjustment of the fluid flow producing means in such a manner that a certain minimum rate of flow is always maintained.

The minimum rate may be set at a value such that the vehicle cannot descend more than a few meters per second so that an inexperienced operator cannot land at too high a vertical velocity, and the minimum rate of flow adjustment means or automatic controller can be in action whenever the power plant operates. It furthermore can be so arranged as to be made inoperative only if the power plant is stopped or the vehicle has landed and is on the ground.

For special advantages and less weight, the vehicle may use fluid flow producing pumps such as shown in my U.S. patent applications Ser No. 229,644; 389,130; 292,629; 453,278; 461,483, or others, and hydrofluid conveying combustion engines, or two fluid combustion engines, may be used in accordance with my U.S. patent applications Ser. No. 344,888; 344,941; 123,348 or 328,395 or in accordance with my U.S. Patent 3,174,432 or figures thereof.

In order to utilize my present invention to the most fullest extent, it, or parts or embodiments thereof may be combined with one or more of my other mentioned co-pending patent applications or with my already granted patents or other patents or technology. Furthermore features or embodiments of one of the figures of this application may be exchanged with those of the other figure and vice versa.

The invention disclosed and claimed in this application is primarily a fluidborne vehicle with substantial vertical axes of rotary propulsion members, but it will be apparent to those skilled in the art that the invention is equally applicable to ships, boats, hydrofoil boats, or air propeller or ducted propeller driven ships or vehicles with substantially horizontal axes of the revolving members or propulsion members. It is intended that the patent shall cover, by suitable expression in the appended claims, whatever features of patentable novelty reside in the invention.

What I claim is:

1. A fluid-borne vehicle comprising, in combination, a frame; at least two rotary propulsion elements rotatably mounted on said frame in laterally spaced relation to each other for rotation about substantially parallel axes; plural hydraulic motors on said frame each driving a respective propulsion element; a fluid flow producing means on said frame having plural fluid deliveries, the number of fluid deliveries being at least equal to the number of motors and the rates of flow of the deliveries being proportional to each other; plural fluid supply lines each connecting a respective delivery to a respective motor whereby said motors are supplied with fluid power in parallel from said fluid flow producing means with each motor being supplied at the full delivery pressure of said fluid flow producing means; and fluid return line means connected to said motors to return fluid to said fluid flow producing means; said vehicle being dirigible by selectively regulating the respective rates of flow through said motors to correspondingly selectively regulate the respective angular velocities of said propulsion elements.

2. A fluid-borne vehicle, as claimed in claim 1, including variable and controllable restricted flow bypass means operatively associated with said motors and selectively regulating the respective rates of flow of fluid through said motors.

3. A fluid-borne vehicle, as claimed in claim 1, including plural variable and controllable restricted flow bypasses each operatively associated with a respective motor and each selectively operable to bypass an adjustable and controllable restricted flow of fluid from the supply line connected to the associated motor to said fluid return line means for selective regulation of the rate of flow of fluid through the associated motor.

4. A fluid-borne vehicle, as claimed in claim 2, wherein said axes are substantially vertical and said propulsion elements are propellers; the selective regulation of the respective rates of flow of fluid through said motors effecting an inclination of said axes away from the vertical direction whereby said vehicle is propelled horizontally in the direction of the inclinaton.

5. A fluid-borne vehicle, as claimed in claim 3, wherein each bypass has a flow orifice variable between a completely closed and a completely opened position; and a control element for each bypass effective to vary the flow area of the orifice thereof.

6. A fluid-borne vehicle, as claimed in claim 3, in which said axes are substantially vertical and said propulsion elements are propellers; said motors and said propellers forming an upwardly directed traction unit with an upwardly directed traction center, while said fluid flow producing means forms a downwardly directed gravity center; said selective regulation of the respective rates of flow of fluid through said motors effecting an inclination of said axes to a limited extent such that said upwardly directed traction center remains higher than said downwardly directed gravity center relative to the surface of the earth, whereby the interaction between said traction center and said gravity center maintains the stability of the vehicle while at rest or in motion in the fluid.

7. A fluid-borne vehicle, as claimed in claim 5, wherein there are at least four propulsion elements; said axes being substantially vertical and arranged at the corners of a regular polygon having a number of sides equal to the number of propulsion elements, and said propulsion elements being propellers; the selective opening of a bypass reducing the angular velocity of the propeller driven by the associated motor to incline said axes in the direction of the propeller operating at a reduced angular velocity, to incline the vehicle in such direction for movement horizontally in such direction; whereby, by selectively opening one or more bypasses, the vehicle may be inclined in any selected direction for horizontal movement in such selected direction.

8. A fluid-borne vehicle, as claimed in claim 7, including a common controller for the control elements of said bypasses and selectively operable to open any one of said bypasses through the associated control element thereof.

9. A fluid-borne vehicle, as claimed in claim 8, wherein said common controller is an upwardly extending lever mounted on said frame for universal movement in any direction and including an abutment engageable with the control elements of said bypasses; said bypasses being arranged around the mounting of said lever as a center and in positions corresponding to the respective positions of the associated propellers, with the control elements of said bypasses extending toward said abutment on said lever; whereby, movement of said lever in a selected direction effects inclination of the vehicle in said direction and horizontal movement of the vehicle in said direction.

10. A fluid-borne vehicle, as claimed in claim 4, including a flow adjustment device operable to conjointly adjust the flow quantities and rates of flow through said deliveries to all of said fluid supply lines; whereby movement of said vehicle upwardly and downwardly is effected by operation of said adjustment device, while horizontal movement is effected by said selective bypass means.

11. A fluid-borne vehicle, as claimed in claim 1, in which said motors and said propulsion elements conjointly form an upwardly directed traction unit with an upwardly directed traction center, while said fluid flow producing means forms a downwardly directed gravity center; the interaction between said traction center and said gravity center maintaining stability of the vehicle while it is stationary or traveling in fluid.

References Cited

UNITED STATES PATENTS

| | | | |
|---|---|---|---|
| 1,939,156 | 12/1933 | Wright | 60—53 |
| 2,514,822 | 7/1950 | Wolfe | 244—17.23 X |
| 2,621,001 | 12/1952 | Roman | 244—7 |
| 2,868,476 | 1/1959 | Schlieben | 244—7 |
| 3,199,286 | 8/1965 | Anderson | 60—53 X |

MILTON BUCHLER, *Primary Examiner.*

ALFRED E. CORRIGAN, *Examiner.*

P. E. SAUBERER, *Assistant Examiner.*